United States Patent [19]

Mitchell

[11] 4,048,858

[45] Sept. 20, 1977

[54] STATIC ROTOR BALANCER

[75] Inventor: Wallace F. Mitchell, Mettawa, Ill.

[73] Assignee: Ammco Tools, Inc., North Chicago, Ill.

[21] Appl. No.: 669,897

[22] Filed: Mar. 24, 1976

[51] Int. Cl.² ............................................. G01M 1/12
[52] U.S. Cl. ......................................................... 73/486
[58] Field of Search ................................... 73/483–487

[56] References Cited

U.S. PATENT DOCUMENTS

| | | | |
|---|---|---|---|
| 2,842,966 | 7/1958 | Rued | 73/483 X |
| 2,902,862 | 9/1959 | Twiford et al. | 73/485 |
| 3,919,889 | 11/1975 | Mitchell | 73/486 |

Primary Examiner—James J. Gill
Attorney, Agent, or Firm—Edmond T. Patnaude

[57] ABSTRACT

A rotor is suspended from a body member which is mounted by two sets of bearings for substantially free pivotable movement about two orthogonally disposed intersecting axes, the axis of rotation of the rotor intersects the point of intersection of the two bearing axes, and a level indicating device is mounted to the body member.

3 Claims, 6 Drawing Figures

STATIC ROTOR BALANCER

The present invention relates in general to the art of balancing rotors and it relates in particular to a new and improved method and apparatus for supporting a rotor for pivotal movement about a point on its own axis of rotation.

BACKGROUND OF THE INVENTION

In order to statically balance a rotor, i.e. to position the center of gravity of the rotor on the axis of rotation, it is a common practice to support the rotor on a pivot disposed above the center of gravity of the rotor and located on the axis of rotation of the rotor. Means such as a spirit level is used to indicate the angle which the axis of rotation makes with the vertical when the rotor comes to rest. Weights are then added to the rotor until the axis of rotation of the rotor lies in the vertical direction.

For use in balancing the wheels of automotive vehicles, the so-called bubble balancers are most commonly used. Such balancers generally employ a ball and platen to provide the pivot point about which the rotor being balanced freely pivots. While such ball and platen pivot assemblies can be satisfactorily used to balance these types of wheels they do not function well with the large massive rotors used in heavy industry. There are two principal reasons for this. One reason is that the extremely high pressure occurring at the pivot point causes the ball surface to flatten, or if the ball is harder than the platen, the platen surface becomes indented. In either case, the enlarged contact area between the ball and the platen reduces the sensitivity of the balancer. The second reason is that the high pressure on the ball will, in many instances, actually crush the ball. As a consequence, large rotors cannot be balanced with the bubble balancers of the prior art.

Another type of rotor balancer utilizes a relatively long wire or tension member to hang the rotor from a support. Such balancers are difficult to read with any degree of accuracy and, of course, they cannot be used with large industrial type rotors because of the limitation in the tensile strength of the wire.

In addition to the need for a balancer for use with large heavy rotors there is also a need for a balancer which can be used to balance relatively small rotors such, for example, as circular saw blades. While I have used the usual ball and platen pivot assemblies to improve the balance of such blades, the balance condition thus achieved is not sufficiently accurate to eliminate all noticable vibration when such blades are rotated at the normal speeds.

SUMMARY OF THE INVENTION

Briefly, there is provided in accordance with the present invention a novel rotor balancer wherein the rotor is suspended from two sets of bearings for free rotational movement about two intersecting axes with the axis of rotation of the rotor intersecting the point of intersection of the two bearing axes. Any suitable means, such for example as a 360° spirit level, is used to indicate the angle of inclination of the rotor relative to the horizontal plane 0. When thus suspended with its center of gravity below the point of intersection of the three axes, the rotor will freely pivot about the substantially infinitesimal point of intersection of the two bearing axes but is supported by the relatively large bearing areas of the two sets of bearings. Accordingly, any rotor which can be supported on its axis of rotation can be accurately balanced since the sizes of the bearing support surfaces are not related to the size of the pivot point which remains substantially infinitesimal for all sizes of bearings.

BRIEF DESCRIPTION OF THE DRAWINGS

Further objects and advantages and a better understanding of the present invention can be had by reference to the following detailed description, wherein.

DETAILED DESCRIPTION OF THE INVENTION

Figure 1:
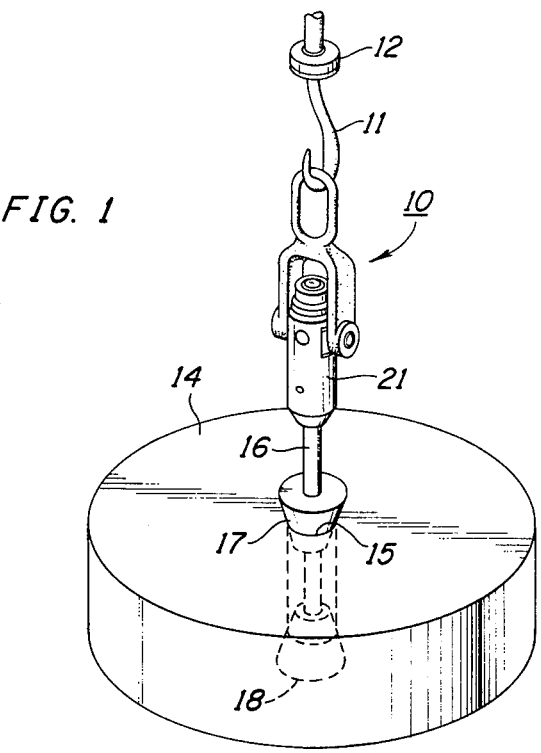
FIG. 1 is a perspective view showing a rotor suspended from a rotor balancer embodying the present invention.

Referring to FIG. 1, a wheel balancer 10 is supported from above by a hook 11 including a swivel 12. The hook 11 may be attached to a cable depending from an overhead crane, or any other suitable means for supporting the device 10 may be employed. A rotor to be balanced is indicated at 14 and has a central hole 15 coaxial with the normal axis of rotation of the rotor. A rigid rectilinear rod 16 extends through the hole 15 and is centrally aligned therwith by means of a pair of centering cones 17 and 18 threadedly mounted on the rod 16 above and below the rotor. The cones 17 and 18 tightly engage the upper and lower edges of the bore 15 as is common in the wheel balancer art.

Figure 2:
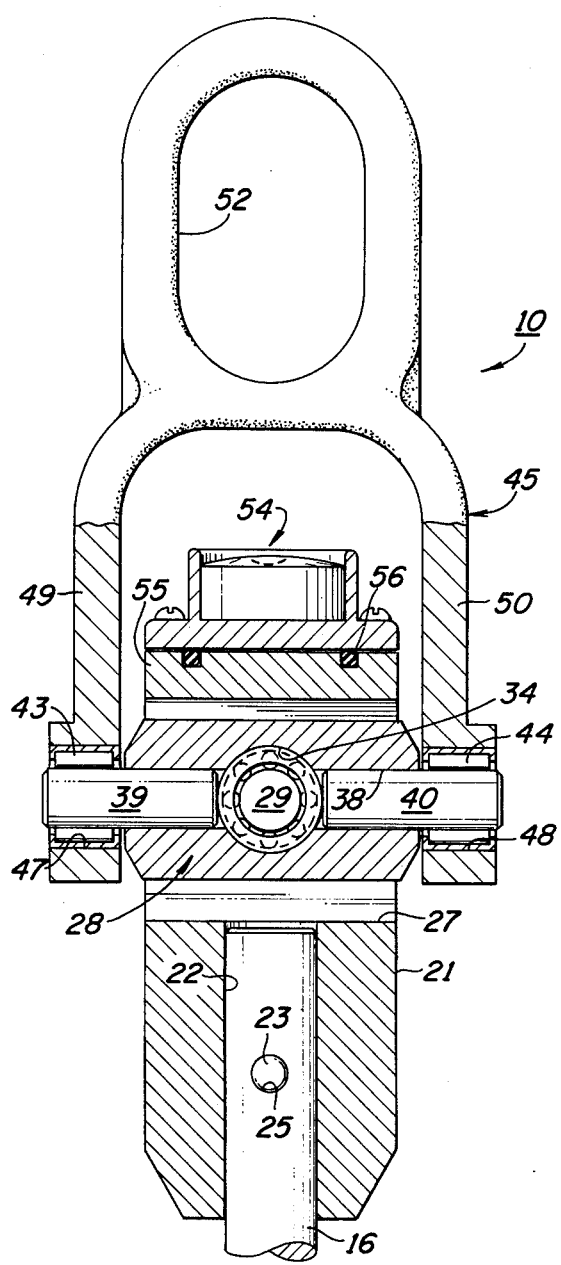
FIG. 2 is an elevational view, partly in cross-section, of a wheel balancer embodying the present invention.
Figure 3:
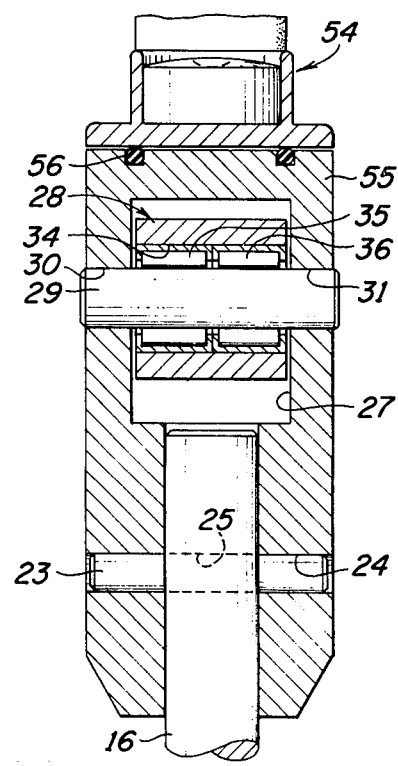
FIG. 3 is a cross-sectional view taken along the line 3—3 of FIG. 2.

As best shown in FIGS. 2 and 3, the rod 16 is secured at the top to a body member 21. More particularly, the rod 16 fits into a bore 22 and is held in place therein by a cross-pin 23 which extends through aligned transverse holes 24 and 25 in the body member 21 and in the rod 16.

A transverse opening 27 is provided in the body member 21 for receiving a member 28 journaled on a shaft 29 which is press-fitted in aligned holes 30 and 31 in the body member 21. The member 28 is provided with a bore 34 in which is mounted a pair of needle bearings 35 and 36. The member 28 is thus journaled for rotation about the central longitudinal axis of the shaft 29.

The member 28 is provided with a second bore 38 which is perpendicular to the bore 34. The axes of the bores 34 and 38 lie in a common plane. A pair of shafts 39 and 40 are respectively pressfitted in the bore 38 on opposite sides of the bearings 35 and 36 and extend into a pair of roller bearings 43 and 44. The bearings 43 and 44 are mounted in mutual axial alignment in a support member 45. The support member is generally U-shaped or bifurcated and the bearings 43 and 44 are mounted in aligned holes 47 and 48 in the legs or bifurcations 49 and 50. An opening 52 is provided near the top of the support member 45 to receive the hook 11 (FIG. 1) or other suitable supporting device.

The central longitudinal axes of the rod 16, the shaft 29, and the shafts 39 and 40 all intersect at a common point. This point is the point about which the axis of rotation of the rotor pivots. Its size is controlled by the dimensional accuracy of the bores 22, 30, 34 and 38 and can be extremely small. Since the weight of the rotor is not carried by this pivot point but rather by the two sets of bearings, the accuracy of the balancer is not inversely related to the weight of the rotor being balanced. Moreover, the pivot point does not shift as the rotor swings back and forth during a balancing operation.

In order to provide a visual indication of the angular relationship between the axis of rotation of the rotor and the true vertical axis, a 360° spirit level 54 is mounted to the top surface 55 of the body member 21. The surface 55 lies perpendicular to the axis of the bore 22 so that the bubble in the level is centered when the rod 16 extends in the true vertical direction. The level 54 is mounted on a resilient O-ring 56 to permit adjustment of the balancer. It will be understood that other means for indicating the angular relationship of the axis of rotation of the rotor and the vertical may be used in place of the spirit level 54 without departing from the present invention.

Figure 4:
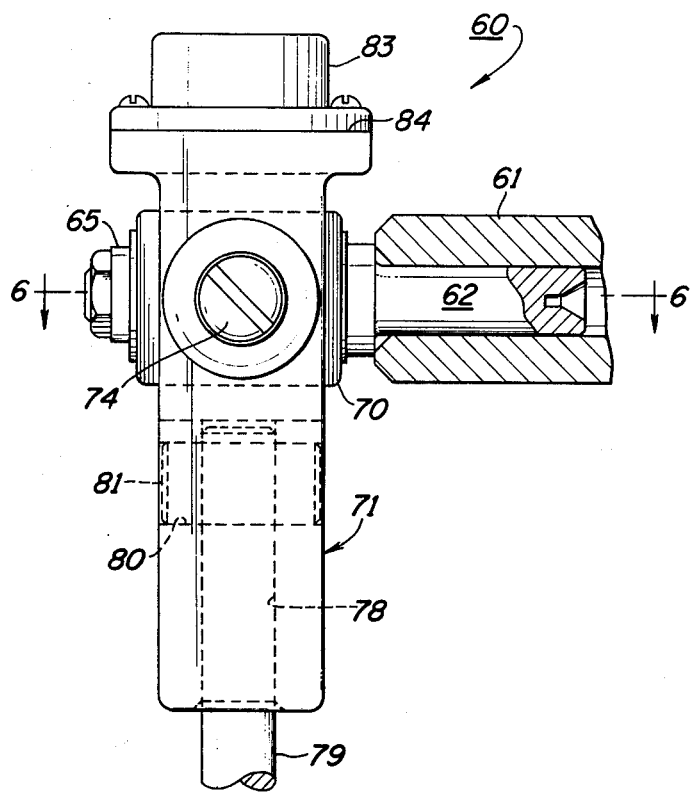
FIG. 4 is a side elevational view, partly in cross-section of another wheel balancer embodying the present invention.
Figure 5:
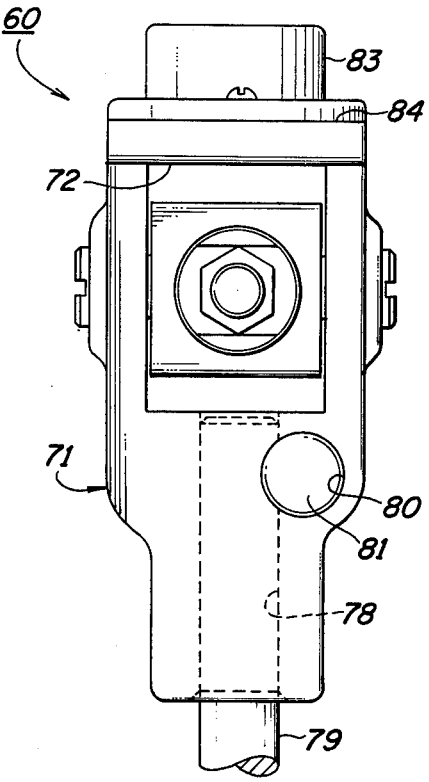
FIG. 5 is a front elevational view of the wheel balancer shown in FIG. 4.
Figure 6:
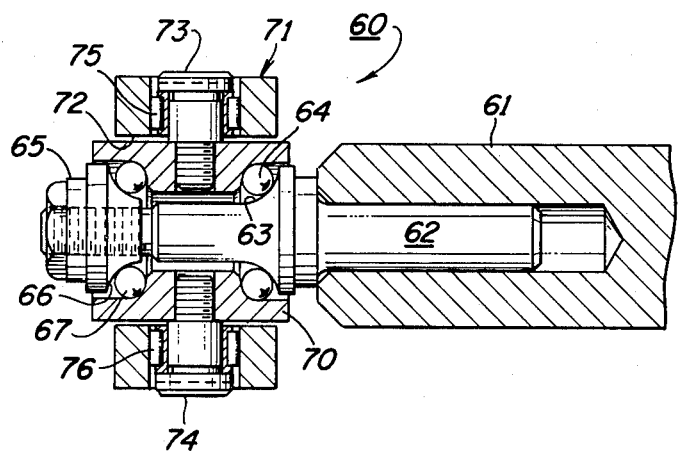
FIG. 6 is a horizontal cross-sectional view taken along the line 6—6 in FIG. 4.

Referring now to FIGS. 4, 5 and 6, there is shown a wheel balancer 60 suitable for use in determining the condition of balance of smaller rotors such as cycle wheels and saw blades. The balancer 60 incorporates a support rod 61 which may be secured between the jaws of a vice or the like (not shown). Although the rod 61 is illustrated as being in a horizontal position, this is not critical so long as the rod 61 does not physically interfere with the rotor during the balancing operation.

A bearing support 62 extends from the rod 61 and provides the inner race 63 for a first set of ball bearings 64. A nut 65 is threaded onto the opposite end of the member 62 and provides a concave inner race 66 for a second set of ball bearings 67. A sleeve member 70 is rotatably carried by the ball bearings 64 and 67 for rotation about a first axis. A rotor support and body member 71 is provided with an opening 72 in which the sleeve member 70 is located. A pair of mutually aligned shaft members 73 and 74 are journaled by respective needle bearings 75 and 76 in the body member 71 and are threadedly secured to the sleeve member 70. The shafts 73 and 74 have a common axis which is coplanar with the axis of rotation of the sleeve 70 on the bearings 64 and 67 and which intersects said axis at the center of the sleeve 70.

In order to mount a rotor to the body member 71, a bore 78 is provided at the bottom to receive the upper end of a rigid, rectilinear rod 79. A transverse hole 80 is provided in the body member 71 for receiving a key 81 for locking the rod 79 in place. The central axis of the bore 78 and thus the central axis of the rod 79 is perpendicular to the common axis of the shafts 73 and 74 and intersects such common axis at the point of intersection of the axes of rotation of the sleeve 70 and the body member 71. The rotor to be balanced is mounted to the rod 79 so that this point of intersection of the three axes lies on the axis of rotation of the rotor. Conventional centering cones, may be used for this purpose as explained hereinbefore in connection with FIG. 1.

This point where the three axes intersect thus provides the pivot point of the balancer about which the rotor pivots during a balancing operation. A 360° spirit level 83 is mounted at the top of the body member 71 on a surface 84 extending perpendicular to the central axis of the bore 78. The position of the bubble in the level 83 thus indicates the direction and extent to which a rotor mounted to the rod 79 is out of balance with respect to its own axis of rotation.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed:

1. Apparatus for statically balancing a rotor relative to the axis of rotation thereof, comprising
   a bifurcated support member for supporting said apparatus from above with the bifurcations of said member depending therefrom,
   a carrier member disposed between said bifurcations,
   first shaft means journaled in said bifurcations for supporting said carrier member for pivotal movement about a first axis,
   a body member,
   second shaft means journaled in said body member for connecting said body member to said carrier member for pivotal movement about a second axis,
   said first and second axes being mutually orthogonal,
   means for mounting said rotor to said body member with the axis of rotation of said rotor intersecting the point of intersection of said first and second axes, and
   level indicating means carried on said body member.

2. Apparatus according to claim 1 wherein said level indicating means comprises
   a spirit level positioned between said bifurcations.

3. Apparatus for balancing a rotor relative to its axis of rotation, comprising
   a shaft extending in a generally horizontal direction,
   means for supporting said shaft from above,
   a carrier member journaled on said shaft for rotation about a substantially horizontal axis,
   a body member journaled on said carrier member for rotation on said carrier member about an axis extending perpendicular to the axis of rotation of said carrier,
   a rotor rod depending from said body member with the central longitudinal axis of said rod intersecting the point of intersection of the axes of rotation of said carrier and body members, and
   level indicating means carried by said body member.

* * * * *